United States Patent
Ito

(10) Patent No.: US 10,373,432 B2
(45) Date of Patent: Aug. 6, 2019

(54) INFORMATION PROCESSING DEVICE, METHOD OF GAME PROCESSING, AND GAME PROCESSING SYSTEM

(71) Applicant: KABUSHIKI KAISHA SEGA Games, Tokyo (JP)

(72) Inventor: Manato Ito, Tokyo (JP)

(73) Assignee: Kabushiki Kaisha Sega Games, Tokyo (JP)

( * ) Notice: Subject to any disclaimer, the term of this patent is extended or adjusted under 35 U.S.C. 154(b) by 224 days.

(21) Appl. No.: 15/625,188

(22) Filed: Jun. 16, 2017

(65) Prior Publication Data

US 2017/0287278 A1 Oct. 5, 2017

Related U.S. Application Data

(63) Continuation of application No. PCT/JP2015/084747, filed on Dec. 11, 2015.

(30) Foreign Application Priority Data

Dec. 16, 2014 (JP) .................................. 2014-254438

(51) Int. Cl.
*G07F 17/32* (2006.01)
*A63F 13/35* (2014.01)
(Continued)

(52) U.S. Cl.
CPC .......... *G07F 17/3255* (2013.01); *A63F 13/30* (2014.09); *A63F 13/35* (2014.09);
(Continued)

(58) Field of Classification Search
USPC ........................................................ 463/25
See application file for complete search history.

(56) References Cited

U.S. PATENT DOCUMENTS

| 7,712,111 B2 * | 5/2010 | Illowsky ............... G06F 1/3203 719/328 |
| 2005/0289266 A1 * | 12/2005 | Illowsky ............... G06F 1/3203 709/250 |
| 2008/0167121 A1 * | 7/2008 | Maeda .................... A63F 13/12 463/30 |

FOREIGN PATENT DOCUMENTS

| JP | 2001-243373 A | 9/2001 |
| JP | 2014-140557 A | 8/2014 |

OTHER PUBLICATIONS

Office Action issued in corresponding Japanese Patent Application No. 2015-241749, dated Dec. 7, 2018 (6 pages).
(Continued)

*Primary Examiner* — Pierre E Elisca
(74) *Attorney, Agent, or Firm* — Osha Liang LLP

(57) ABSTRACT

An information processing device includes a controller that generates a list that includes a plurality of players while a game is underway, a receiver that receives a request from an external device to acquire an intangible item to be executed in the game based on input from one of the players, and a transmitter that transmits a signal to the external device. The controller counts a number of predetermined players who have input the request within a first time period among the plurality of players. The controller outputs, to the transmitter, an instruction to award the intangible item to the predetermined players when the number is less than a predetermined value. The controller outputs, to the transmitter, an instruction to award the intangible item and an additional intangible item to the predetermined players when the number is greater than or equal to the predetermined value.

20 Claims, 12 Drawing Sheets

(51) Int. Cl.
*A63F 13/69* (2014.01)
*A63F 13/79* (2014.01)
*A63F 13/30* (2014.01)

(52) U.S. Cl.
CPC .............. *A63F 13/69* (2014.09); *A63F 13/79* (2014.09); *G07F 17/329* (2013.01); *G07F 17/3269* (2013.01); *G07F 17/3272* (2013.01)

(56) References Cited

OTHER PUBLICATIONS

Pocket land and monthly publication—application—style 1st vol. No. 3 and incorporated company—application—style, Aug. 28, 2014, No. 3 per volume [the], and p. 67 (1 page).
International Search Report issued in corresponding International Application No. PCT/JP2015/084747 dated Mar. 8, 2016 (5 pages).
Office Action issued in corresponding Japanese Application No. 2014-254438 dated Aug. 3, 2015 (6 pages).
Written Opinion issued in corresponding International Application No. PCT/JP2015/084747 dated Mar. 8, 2016 (10 pages).
Pocketland "Kyoryuko Gacha", [online], retrieved on Jul. 9, 2015, published on Jul. 30, 2014, http://prtimes.jp/main/html/rd/p/000000036.000008134.html (4 pages).

* cited by examiner

| ID | Player name | Attribute information |
|---|---|---|
| 0010 | B | ... |
| 0032 | C | ... |
| 0058 | D | ... |
| ⋮ | ⋮ | ⋮ |

FIG. 6

| ID | Player name | Drawing time |
|---|---|---|
| 0005 | A | Sept. 29, 9:00 p.m. |
| 0010 | B | Sept. 29, 8:45 p.m. |
| ⋮ | ⋮ | ⋮ |

FIG. 7

| Player A | First list | Second list | |
|---|---|---|---|
| | Player name | Player name | Drawing time |
| | B | B | 9:00 p.m. |
| | C | C | 8:45 p.m. |
| | D | D | 8:42 p.m. |
| | F | F | 8:10 p.m. |
| | ⋮ | — | — |
| | (A) | (B) | |

| Player B | First list | Second list | |
|---|---|---|---|
| | Player name | Player name | Drawing time |
| | A | A | 9:00 p.m. |
| | F | — | — |
| | G | — | — |
| | H | — | — |
| | ⋮ | — | — |
| | (C) | (D) | |

| Player C | First list | Second list | |
|---|---|---|---|
| | Player name | Player name | Drawing time |
| | A | A | 9:00 p.m. |
| | B | B | 8:45 p.m. |
| | I | — | — |
| | J | — | — |
| | ⋮ | — | — |
| | (E) | (J) | |

FIG. 10

INFORMATION PROCESSING DEVICE, METHOD OF GAME PROCESSING, AND GAME PROCESSING SYSTEM

BACKGROUND

Technical Field

The present invention generally relates to an information processing device, a method of game processing, and a game processing system.

Related Art

There are conventional systems that control the joint purchases of users who are online via a network, and systems that provide users with joint purchase coupons (see Patent Literature 1, for example).

Patent Literature 1: Japanese Laid-Open Patent Application 2001-243373

Certain game systems today are known as free to play (F2P), in which a game intended for a smart phone or other such mobile terminal is downloaded at no charge, and basic play can be enjoyed for free. These F2P games include events in which intangible items, etc., are awarded by drawings (called "gachas").

The objectives of the joint purchases in the technology discussed in Patent Literature 1 are the compression of raw materials by scheduling and committing to purchases by large numbers of people, and providing users with tangible merchandise, etc., more inexpensively. On the other hand, cooperation such as joint purchases has not been examined for F2P games that provide intangible items. This is because intangible items, as a general rule, do not entail material costs, so people are not used to the idea of a volume discount.

Thus, in conventional games, there was no system with which cooperation could be suitably fostered among a plurality of players in acquisition requests, such as drawing processing or purchase processing, while enhancing the enjoyability of the game.

SUMMARY

One or more embodiments of the present invention provide a system for suitably fostering cooperation among a plurality of players in acquisition requests, such as drawing processing or purchase processing in a game, while enhancing the enjoyability of the game. In this way, one or more embodiments of the invention provide a technological improvement over conventional systems.

The information processing device according to one or more embodiments of the present invention comprises a first generator that generates a first list including a plurality of players while a game is underway, a determination component that determines whether or not the count value of players who are among the players included in the first list and who have made a request within a first predetermined time period to acquire an intangible item to be executed in the game is greater than or equal to a predetermined value, and an award component that awards the player who made the acquisition request with the intangible item that is the result of the request if the count value is less than the predetermined value, and awards the player who made the acquisition request with the intangible item that is the result of the request and an additional intangible item if the count value is greater than or equal to the predetermined value.

According to one or more embodiments of the present invention, an information processing device may comprise a controller that generates a list that includes a plurality of players while a game is underway, a memory that stores the first list, a receiver that receives a request from an external device to acquire an intangible item to be executed in the game based on input from one of the players, and a transmitter that transmits a signal to the external device. The controller counts a number of predetermined players who have input the request within a first time period among the plurality of players. The controller may output, to the transmitter, an instruction to award the intangible item to the predetermined players when the number is less than a predetermined value. The controller may output, to the transmitter, an instruction to award the intangible item and an additional intangible item to the predetermined players when the number is greater than or equal to the predetermined value.

According to one or more embodiments of the present invention, a method that causes a computer to execute a game program may comprise generating, with a controller of the computer, a first list that includes a plurality of players while a game is underway; storing, with a memory of the controller, the first list; receiving, with a receiver of the computer, a request from an external device to acquire an intangible item to be executed in the game based on input from one of the players; counting, with the controller, a number of predetermined players who have input the request within a predetermined time period among the plurality of players; outputting, from the controller to a transmitter of the computer, an instruction to award the intangible item to the predetermined players when the number is less than a predetermined value, and an instruction to award the intangible item and an additional intangible item to the predetermined players when the number is greater than or equal to the predetermined value; and transmitting, from the transmitter to the external device, the instruction.

According to one or more embodiments of the present invention, a game processing system may comprise a game device and an information processing device. The game device may comprise a first transmitter that transmits, to the information processing device, request information that indicates a request to acquire an intangible item to be executed in the game based on input from a player; and a first receiver that receives a result of the request, and The information processing device may comprise a controller that generates a first list including a plurality of players while a game is underway, a memory that stores the first list, a second receiver that receives, from the first transmitter, the request information, and a second transmitter that transmits a signal to the game device. The controller may count, based on the request information, a number of predetermined players who have input the requests within a predetermined time period among the plurality of players. The controller may output, to the second transmitter, an instruction to award the intangible item to the predetermined players when the number is less than a predetermined value. The controller may output, to the second transmitter, an instruction to award the intangible item and an additional intangible item to the predetermined players when the number is greater than or equal to the predetermined value.

BRIEF DESCRIPTION OF DRAWINGS

FIG. 6 shows an example of a first list according to one or more embodiments of the present invention.

FIG. 7 shows an example of a second list according to one or more embodiments of the present invention.

FIG. 10 shows an example of adding to the second list according to one or more embodiments of the present invention.

DETAILED DESCRIPTION

Embodiments of the present invention will be described below through reference to the drawings. However, embodiments of the present invention described below are nothing but an example, and are not intended to exclude the application of various modifications or techniques not specifically expressed below. That is, embodiments of the present invention can be modified in various ways without departing from the gist thereof. Also, in the discussion of the drawings below, portions that are the same or similar will be assigned the same or similar reference signs. The drawings are simplified, and do not necessarily match the actual dimensions, proportions, and so forth. From one drawing to the next, there may be portions in which the dimensional relations and proportions are not the same.

A information processing device, a method of game processing, and a game processing system in one or more embodiments of the present invention will be described below through reference to the drawings.

Overview of Game Processing System

Figure 1:
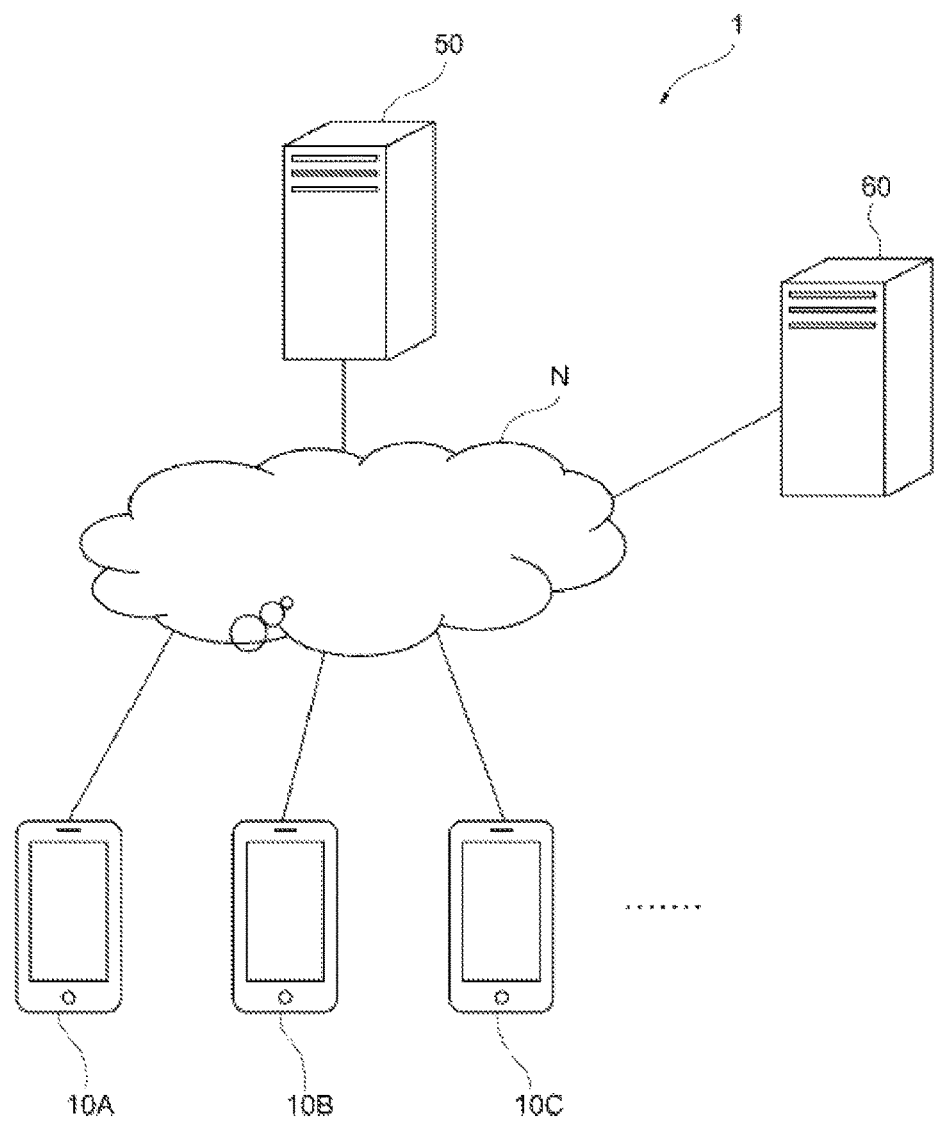
FIG. 1 is a simplified diagram of an example of a game processing system according to one or more embodiments of the present invention.

FIG. 1 is a simplified diagram of an example of a game processing system in one or more embodiments of the present invention. As shown in FIG. 1, a game processing system 1 is such that, for example, game devices 10A, 10B, and 10C operated by different players are connected via a network N to a server (information processing device) 50 and a billing server 60 provided by a game management company.

When the game devices are described separately, they will be referred to by their reference signs 10A, 10B, and 10C, but when there is no need to distinguish between them, they will be referred to collectively with the number 10. The game devices 10 are, for example, a mobile terminal, a tablet terminal, a PDA (personal digital assistant), a personal computer, a game machine, or the like. The game device 10 is an example of an external device.

The game devices 10 are connected online to the server 50 via the network N, and execute game play in web-game format.

The server 50 controls games that are fundamentally played for free, so-called F2P online games and so forth, by a plurality of players via the network N. The server 50 receives commands inputted from the game devices 10, controls the progress of the game, and manages and distributes data that is necessary for the execution of the game.

The billing server 60 performs in-game billing processing in response to billing requests from the game devices 10 or the server 50.

The network N is the Internet, etc., and includes wireless LAN access points, mobile telephone base stations, and the like.

Hardware Configuration

Figure 2:
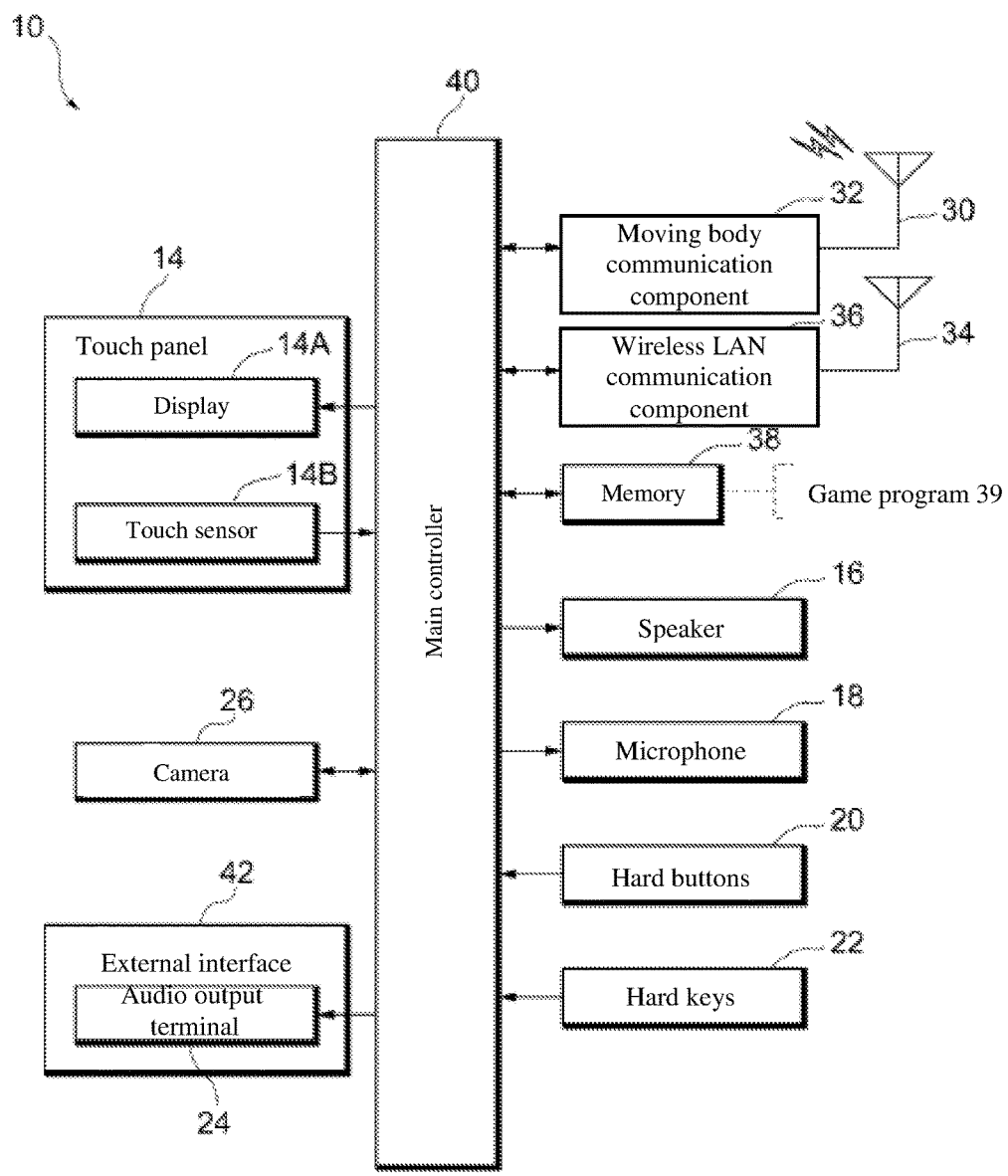
FIG. 2 shows an example of a hardware configuration of a game device according to one or more embodiments of the present invention.

The hardware configuration of the game devices 10 will now be described. FIG. 2 shows the hardware configuration of one of the game devices 10 shown in FIG. 1 in one or more embodiments of the present invention.

The game device 10 shown in FIG. 2 has at least a moving body communication antenna 30, a moving body communication component 32, a wireless LAN communication antenna 34, a wireless LAN communication component 36, a memory 38, and a main controller 40, and further has an external interface 42 or the like that includes a camera 26 and an audio output terminal 24.

A touch panel 14 functions both as a display device and as an input device, and is made up of a display (display screen) 14A that handles display functions, and a touch sensor 14B that handles input functions. The display 14A is made up, for example, of a liquid crystal display, an organic EL (electroluminescence) display, or another such common display device. The touch sensor 14B consists of an element that senses touch and is disposed on the upper face of the display 14A, and a transparent input surface that is laminated over this. The touch sensing method of the touch sensor 14B can be any known method, such as an electrostatic capacity method, a resistance film method (pressure sensitive method), or an electromagnetic induction method.

The touch panel 14 displays, under control by the main controller 40, game images generated by the execution of a game program 39 stored in the memory 38. The touch panel 14 (input device) senses the movement of an object (a player's finger, a touch pen, etc.; hereinafter "finger" will be used as a representative example) touching the input surface, thereby receiving an operation input, and gives the main controller 40 information about the position of the contact. The movement of the finger is sensed as coordinate information indicating the position or region of the contact point, and the coordinate information is expressed, for example, as biaxial coordinates in the short-side direction and the long-side direction of the touch panel 14.

The game device 10 is connected through the moving body communication antenna 30 or the wireless LAN communication antenna 34 to the network (Internet) N, and is able to exchange data with the server 50.

The server 50 functions as a server that is the hub of this game system, collecting play data, such as the game being executed on the game device 10, via the network N, controlling the progress of the game on the basis of this play data, and so forth.

In one or more embodiments of the present invention, when the game device 10 is connected to the network N and the server 50, this creates an online game system with which various games can be provided online to that game device 10. With this online game system, play data corresponding to many types of game is managed and provided, so that a player can have as much fun as if he were playing a variety of games at a video game arcade.

The game program 39 according to one or more embodiments of the present invention may be one that is installed in the game device 10, or it may be one with which the game functions are provided from a server online (not limited to the server 50).

Figure 3:
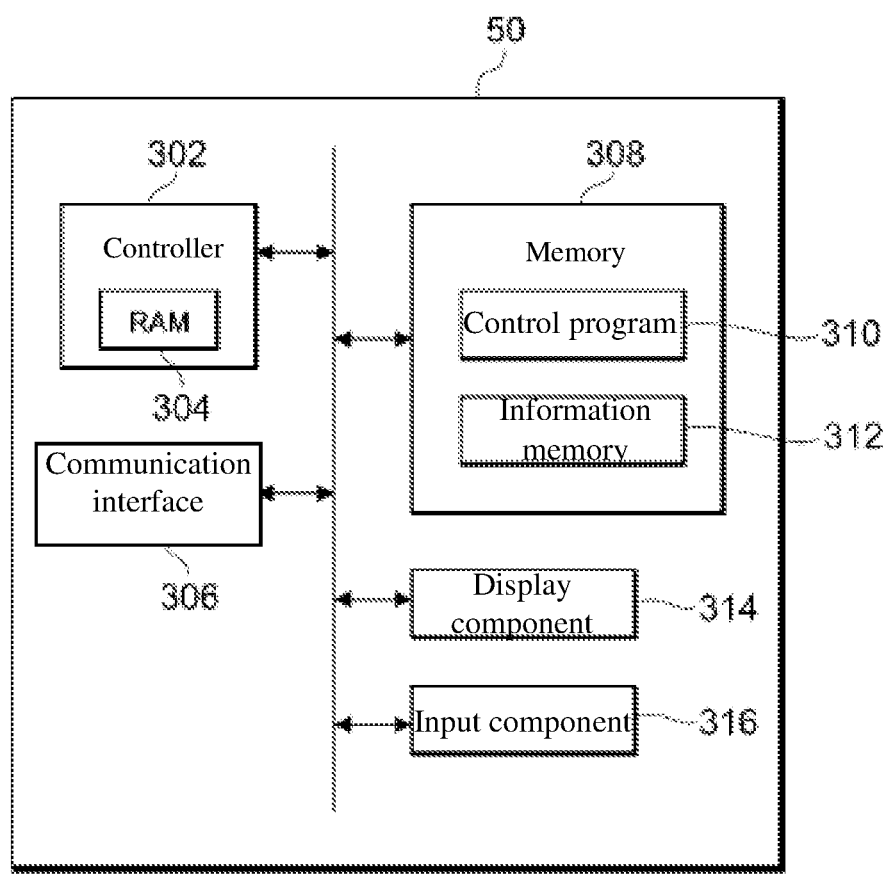
FIG. 3 shows an example of a hardware configuration of a server according to one or more embodiments of the present invention.

Next, the hardware configuration of the server 50 will be described. FIG. 3 shows an example of the hardware configuration of the server 50 in one or more embodiments of the present invention. As shown in FIG. 3, the server 50 has a controller 302, a communication interface 306, a memory 308, a display component 314, and an input component 316, with the various components connected via a bus line.

The controller 302 includes a CPU, a ROM, a RAM 304, etc. The controller 302 executes a control program 310, etc., stored in the memory 308, and is therefore configured to carry out processing related to online gaming, for example, in addition to its general function as an information processing device.

The RAM 304 temporarily stores various kinds of information, and is used as a work area when the CPU is executing various kinds of processing.

The communication interface 306 controls communication with the game devices 10 and the billing server 60 via the network N.

The memory 308 consists of a hard disk drive or the like, for example, and stores the control program 310 in addition to storing applications and data (not shown) for carrying out its function as a general information processing device. The memory 308 also has an information memory 312.

The control program 310 is a program for performing processing related to a game, and is a program that receives commands from the game device 10 and controls the progress of the game while it is being played on the basis of these commands. The control program 310 is stored on a recording medium that can be read by a computer, and may be read out from this recording medium and stored in the memory 308.

The information memory 312 stores data that is necessary for use in the game, data related to the user, and so forth, for example.

The display component 314 displays information to the manager. The input component 316 receives input from the manager, and receives commands from the manager. Also, the server 50 does not necessarily need to be provided with the display component 314 and the input component 316, and instead the display component 314 and the input component 316 may be connected to the server 50 from the outside.

Overview of Game

An overview of the game in question in accordance with one or more embodiments of the present invention will now be given. The game in one or more embodiments of the present invention involves having a drawing (gacha). This drawing allows a player to acquire intangible items, such as characters, drawing tickets, or game items. A game item, in the case of a battle game, is a weapon or the like that increases the fighting strength of a player, for example. A drawing may be the purchase of an intangible item, but is not limited to that, as long as it is an acquisition request for an intangible item from a player, whether directly or indirectly. The following description will use a drawing as an example, but in the following embodiment, the same processing can be carried out if "drawing" is replaced by "the purchase of an intangible item," etc.

There are two kinds of drawings: a free drawing (free gacha) and a pay drawing (pay gacha). Different probability tables are set up for free and pay drawings. Consequently, the probability that an intangible item of high value to the player can be acquired is higher with a pay drawing than with a free drawing. Alternatively, different intangible items can be acquired by a pay drawing than by a free drawing.

With the game in one or more embodiments of the present invention, if at least a predetermined number of players (out of a certain, limited number of players) do a drawing within a predetermined time period, an additional intangible item besides the one obtained by drawing (hereinafter also referred to as a reward) is awarded to the players who did the drawing. The function for making the above-mentioned drawing processing possible will be described below. Examples of the reward include game items, characters, items that strengthen a game item, and drawing tickets.

Functional Configuration

Figure 4:
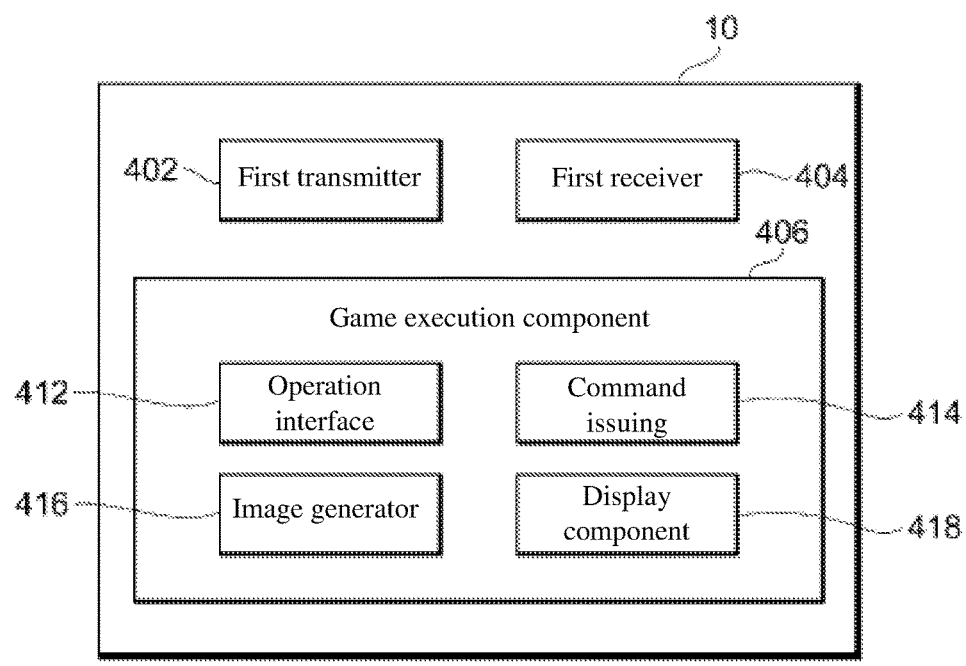
FIG. 4 is a block diagram of an example of a functional configuration of the game device according to one or more embodiments of the present invention.

FIG. 4 is a block diagram of an example of the functional configuration of the game device 10 in one or more embodiments of the present invention. The game device 10 shown in FIG. 4 includes, for example, a first transmitter 402, a first receiver 404, and a game execution component 406.

The first transmitter 402 can be realized, for example, by the main controller 40, the moving body communication component 32, the wireless LAN communication component 36, the game program 39, etc. The first transmitter 402 sends the server 50 a command based on what has been inputted by the player, drawing information (request information) that includes information about the player who made the drawing (acquisition request) executed in the game, and so forth.

The first receiver 404 can be realized, for example, by the main controller 40, the moving body communication component 32, the wireless LAN communication component 36, the game program 39, etc. The first receiver 404 receives information related to a drawing (gacha) that is an event in the game (including drawing results), data related to the progress of the game, and so forth.

The game execution component 406 can be realized, for example, by the main controller 40, the game program 39, etc. The game execution component 406 executes the game (a plurality of events, for example). The game execution component 406 includes an operation accepting component 412, a command issuing component 414, an image generator 416, and a display component 418.

The operation accepting component 412 accepts player operations inputted from the touch panel 14 while the game is underway (i.e., during gameplay). For instance, the operation accepting component 412 accepts an operation for executing a drawing during an event in the game. The details of the accepted operation are outputted to the command issuing component 414.

The command issuing component 414 issues a command according to the operation accepted by the operation accepting component 412, and sends the issued command through the first transmitter 402 to the server 50. For instance, the command issuing component 414 issues a command indicating an operation for executing a drawing (also called a drawing execution command). At this point, player information and identification information for identifying the game device 10 are sent along with the drawing execution command. Consequently, the server 50 can ascertain which player or which game device 10 executed the drawing.

The image generator 416 acquires data related to the progress of the game, which was received by the first receiver 404, and generates the image to be displayed on the touch panel 14 on the basis of this information. The image generator 416 outputs the generated image to the display component 418.

The display component 418 displays the acquired image on the touch panel 14. Consequently, the game device 10 displays an image based on data sent from the server 50 and related to the progress of the game, allowing the game to proceed. For example, the display component 418 displays the drawing result, notification details (discussed below), etc.

Figure 5:
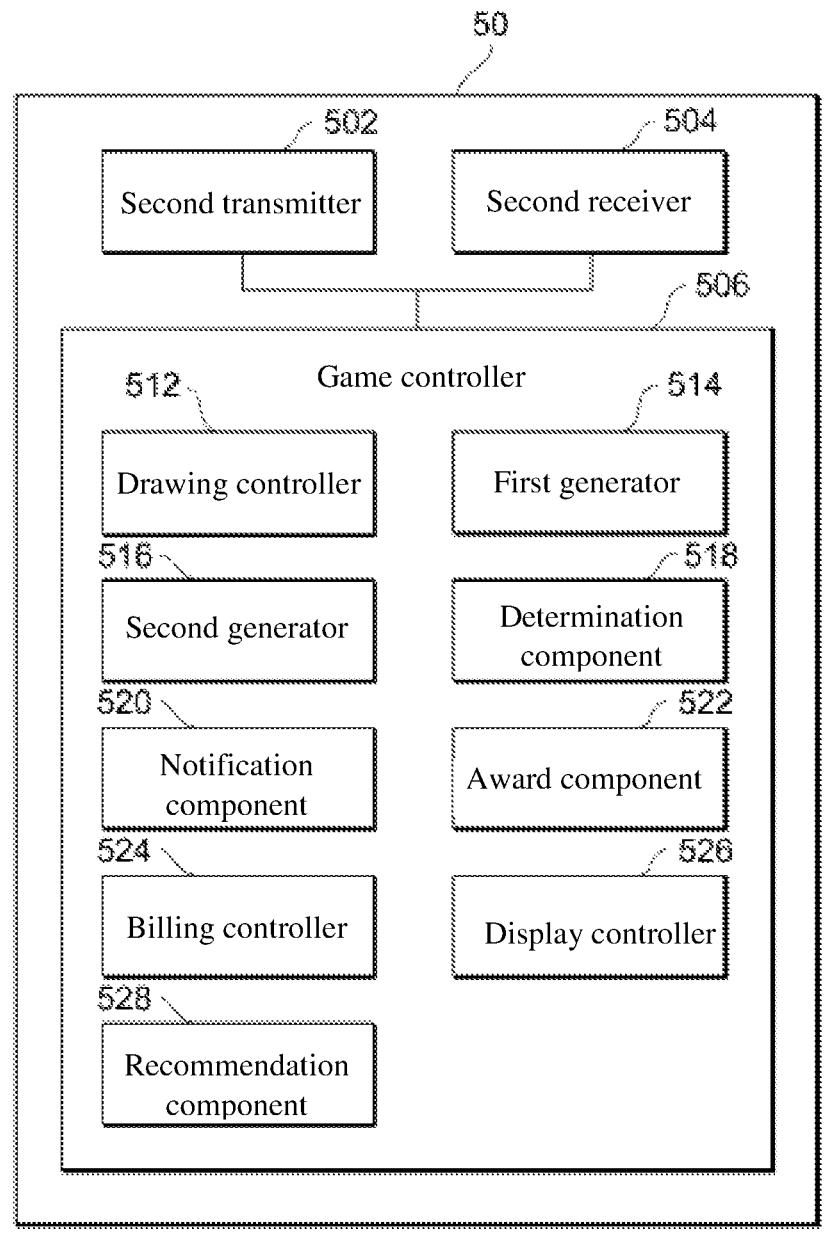
FIG. 5 is a block diagram of an example of a functional configuration of the server according to one or more embodiments of the present invention.

The function of the server 50 will now be described. FIG. 5 is a block diagram of an example of the functional configuration of the server 50 in one or more embodiments of the present invention. The server 50 shown in FIG. 5 includes, for example, a second transmitter 502, a second receiver 504, and a game controller 506.

The second transmitter 502 can be realized, for example, by a communication interface 106, a controller 102, the control program 310, etc. The second transmitter 502 sends the game devices 10 a signal including information related to a drawing (including drawing results), data related to the progress of the game, and so forth. The second transmitter 502 may send the game devices an instruction to award an intangible item to a player.

The second receiver 504 can be realized, for example, by the communication interface 106, the controller 102, the control program 310, etc. The second receiver 504 receives, from the game device 10, a command based on what has been inputted by the player, drawing information (request information) that includes information about the player who made the drawing (acquisition request), and so forth. For example, the acquisition request may be a request to acquire an intangible item to be executed in the game.

The game controller 506 can be realized, for example, by the controller 102, the control program 310, etc. The game controller 506 controls the progress of the game based on player operations, etc. For instance, the game controller 506 acquires a command based on details of a player's operation, and uses this command to control the progress of an event in the game, such as a battle.

Also, the game controller 506 includes a drawing controller (request controller) 512, a first generator 514, a second generator 516, a determination component 518, a notification component 520, an award component 522, a billing controller 524, a display controller 526, and a recommendation component 528, in order to execute the above-mentioned game (a game including an event that prompts joint drawings, for example).

The drawing controller 512 controls drawings (gachas). For example, if at least a predetermined number of players set as a quota, out of a plurality of players that satisfy a predetermined condition, have made a drawing within a predetermined time period, the drawing controller 512 controls the drawing event so that a reward is given to the players who made the drawing.

For instance, the drawing controller 512 launches a campaign to enable the execution of a drawing event, at either regular or irregular periods, and notifies the players of how long the campaign will last. A campaign lasts for one day, for example.

Also, the drawing controller 512 controls the start time from which the predetermined time period is reckoned, on the basis of the clock time specified by the player for the start of a drawing event. Consequently, when a player himself decides the start time of the predetermined time period, for example, this drawing event can be commenced at a favorable time when people are gathered around, such as at a party.

Also, the drawing controller 512 may allow the predetermined number set as the quota to be changed by the players, or may allow it to be changed according to the number of players who satisfy a predetermined condition. Consequently, the quota can be changed according to the wishes of the players, or a quota can be set that is suited to the number of players who are gathered.

Also, the drawing controller 512 may provide an upper limit to the number of rewards that can be acquired by one player during the campaign period. This prevents more rewards than necessary from being given out.

The first generator 514 generates a first list that includes a plurality of players (also called a candidate list) while the game is underway. The generated first list is stored in the memory 308. For instance, the first generator 514 may generate one or more first lists including players who satisfy a predetermined condition, for each player. More specifically, the first generator 514 generates a first list on the basis of location information indicating a position related to a player, or a friend list that includes players registered as friends. When location information is used, the first generator 514 generates a first list that includes players within a predetermined area, or generates a first list that includes players within a predetermined range from a certain player. As another example of a first list, the first generator 514 may produce a first list by collecting players of the same level on the basis of parameters within the game, such as player level, or may generate a first list on the basis of login time to the game. As another example of a first list, the first generator 514 may produce a first list of all players, or may generate a first list by collecting players other than those who have not logged in for a certain length of time, from among all players.

The second generator 516 generates, for each first list, a second list (also called a participant list) that includes players who have made a drawing within a predetermined time period for a drawing event controlled by the drawing controller 512. Also, the second generator 516 sorts the players included on the second list on the basis of the drawing time (request time) when these players made the drawing (acquisition request). Consequently, when the second list is displayed, the players can ascertain the times when drawings were made in ascending or descending order. When a player makes a friend request to a player on the second list, the drawing time can be added to the friend request determination criteria. The second generator 516 is not necessarily a required component if there is no need to display a second list.

The determination component 518 counts the number of predetermined players who have input the drawing (an acquisition request) within a first predetermined time period (first time period) among the predetermined players. Then, the determination component 518 determines whether or not the count value of players (the number of predetermined players) who are among the players included in the first list and who have performed a drawing to be executed in the game within the first predetermined time period is greater than or equal to a predetermined value. The "first predetermined time period" refers to a time limit until the quota is reached, for example, and is a set length of time such as one hour or two hours. For example, the first predetermined time period may be from when the first player makes the request until the quota is reached (predetermined ending point). The "predetermined value" is the same as the predetermined number set for the quota. Regarding a determination as to whether or not another player has made a drawing, since information to the effect that a drawing has been made is sent to the server 50 when a player makes a drawing, the determination component 518 can make this determination by receiving this information.

Also, when a particular player has made a drawing, the determination component 518 may count the players who have made a drawing within the first predetermined time period after the drawing time, and within a second predetermined time period (second time period) before the drawing time when a particular player out of the players included in the first list, generated according to this particular player, made a drawing. Consequently, the time limit to reach the quota can be extended, making it easier to reach the quota. The second predetermined time period may be the same as or different from the first predetermined time period. For example, the second predetermined time period may be from a predetermined starting point before the first player makes the request.

What is counted by the determination component 518 may be only players who have made a pay drawing, or may be players who have made either a pay drawing or a free drawing.

When a particular player (second player) has made a drawing, the notification component 520 notifies players having a first list that includes this particular player that a drawing has been made (including the drawing time), and how much of a predetermined time period is left. In other words, when the second receiver 504 receives the request based on input from a second player, the controller causes information that indicates the received request and how much time remains in the first time period to be displayed on a play screen of the game for a second predetermined player. Consequently, on the system side, players having a first list that includes the particular player who has made a drawing can learn that there is a player who made a drawing and when it was made, and this provides players with motivation to make drawings.

The award component 522 awards an intangible item that is a drawing result to players who made a drawing when the count value counted by the determination component 518 is less than a predetermined value, and awards an intangible item that is a drawing result and an additional intangible item to players who made the drawing when the count value is greater than or equal to a predetermined value. That is, if the count value for players who have made a drawing in the first list is less than a predetermined value (a predetermined number set as a quota), the quota has not been reached, and the award component 522 awards only the intangible item that is the drawing result. On the other hand, if the count value for players who have made a drawing in the first list is greater than or equal to a predetermined value, the quota has been reached, and the award component 522 awards both the intangible item that is the drawing result and a reward.

Also, if the count value has become greater than or equal to the predetermined value after an intangible item that is the drawing result has been awarded to players who have made a drawing, the award component 522 may give a reward to the players counted as this count value. Consequently, the drawing result is awarded immediately after the drawing, so players suffer no loss, and if the quota is reached (if the count value is greater than or equal to a predetermined value), they can also receive a reward, so the players profit. The award component 522 may change the reward that is given according to the number of the quota. For instance, the award component 522 may give a reward of higher value the higher is the number of the quota.

The billing controller 524 controls billing processing according to billing instructions from players. The billing controller 524 sends the billing server 60 information about predetermined players who have issued billing instructions, and the billing server 60 performs billing processing so as to withdraw a predetermined amount of money using a bank account number or a credit card number registered in the information about the predetermined player that is sent.

In the above example, direct billing processing was performed in performing drawing processing, but billed items may be purchased by billing, and drawing processing may be performed for the consumption and exchange of these billed items. In the following description, "billing" shall encompass not only direct billing, but also indirect billing through the consumption of billed items. A billed item is an item that can at least be obtained by players by billing, and may be distributed at no charge in the event of server trouble, or may be distributed at no charge as a login reward.

The display controller 526 controls so that a second list is displayed on the play screen of the game. The play screen is, for example, the screen that is displayed on the display screens of the game devices 10. At this point, the display controller 526 may rearrange the second list in the order of the drawing times when drawings were made. This allows a player looking at the second list to confirm the players who have made drawings recently, the players who made drawings in the early part of a predetermined time period, and so forth.

The recommendation component 528 generates a third list that includes players (third predetermined players) who are not included in the first list and who have made a drawing within a predetermined time period, and recommends that the players included in the third list be included in the first list. For example, the recommendation component 528 causes the third list to be displayed on a play screen of the game. The recommendation component 528 produces, for example, a third list that includes players who are not included in a friend list (the first list) and who have made a drawing within a predetermined time period. This third list is also called a recommendation list (recommendation information). With the recommendation list, players are rearranged by the recommendation component 528 on the basis of drawing times, and a friend request button may be provided. When a player presses the friend request button, a friend request is made to the player corresponding to that button. For example, the recommendation component 528 may rearrange the drawing times in descending order.

In this case, the determination component 518 may update the players included in the first list so that the count value includes the number of players newly included in the first list on the basis of the recommendation of the recommendation component 528, or the number of players newly included in the first list because a player issued a friend request on his own, without being based on the recommendation of the recommendation component 528, and the number of friends has been increased. An upper limit to the effective number used as the count value may be provided, out of the number of players newly included as a result of the updating of the first list by the addition of friends, either by the players on their own or on the basis of a recommendation. Consequently, even those players with few friends included in the first list will have a higher possibility of reaching the quota, and at the same time, the opportunity to create friend relationships among players can be provided. Also, providing an upper limit to the effective number used as the count value prevents people from temporarily increasing the number of friends for the sole purpose of increasing the count value.

When a drawing is made on a billed basis, among groups that reach the quota, there is the possibility that there will be groups with a high billing capacity. On the system side, ascertaining which groups have this high billing capacity makes it possible to provide to those groups drawings with which intangible items of higher value than those obtained by an ordinary drawing can be awarded.

Specific Example

A specific example of when the first list is a friend list will now be described. FIG. 6 shows an example of a first list in one or more embodiments of the present invention. The first list shown in FIG. 6 is a friend list of player A, and list categories include player IDs, player names, and attribute information. Player A may or may not be included in the first list. Player ID is information used to identify a player, and may be used in a friend search. The player name is the name arbitrarily selected by that player, and is used when displaying the list. Attribute information is information that includes information about items used in the game, etc.

If a friend list is the first list, then generating a first list at the first generator 514 includes the meaning of acquiring a first list. The reason is that since a friend list has already been generated at the time of a drawing event, the first generator 514 does not need to generate a first list every time there is a drawing event.

FIG. 7 shows an example of a second list in one or more embodiments of the present invention. The second list shown in FIG. 7 is a participant list, which lists the players who are among the players included in the first list and who have participated in a drawing event. If player A participates in a drawing event, then player A himself is included in this participant list. The list categories in the second list include the IDs of the players who have made a drawing, player names, and drawing times. The second generator 516 may use drawing times in sorting the second list. The second list shown in FIG. 7 is an example of sorting by drawing times in descending order.

Figure 8:
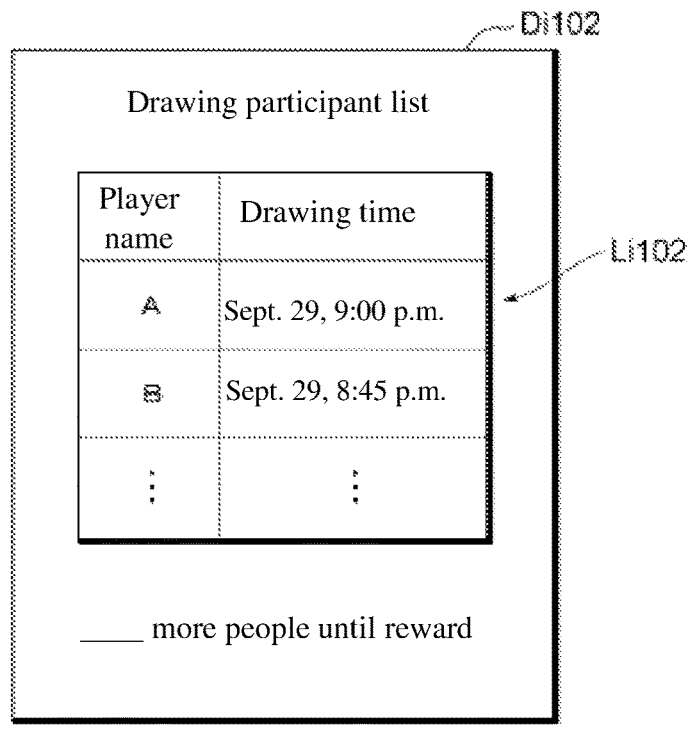
FIG. 8 shows an example of a screen on which a second list is displayed according to one or more embodiments of the present invention.

FIG. 8 shows an example of a screen on which a second list is displayed in one or more embodiments of the present invention. The screen shown in FIG. 8 is a screen Di102 on a game device 10, and the second list Li102 shown in FIG. 7 is displayed. On the screen Di102 is displayed, for example, "_____ more people until award," to clarify how many more people are needed until the quota is reached, making it possible to prompt a player to perform drawing processing. The screen information shown on the screen Di102 is generated by the display controller 526, for example.

Figure 9:
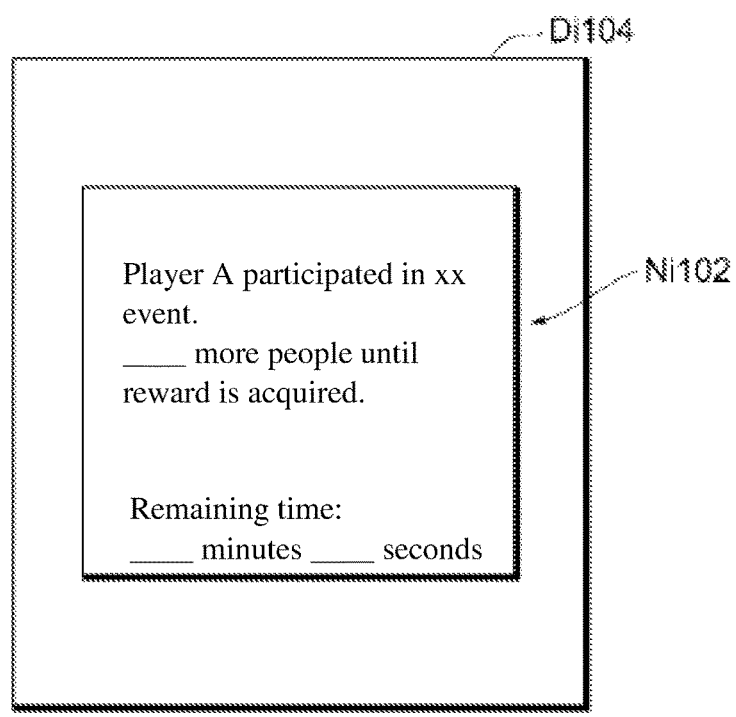
FIG. 9 shows an example of notification details according to one or more embodiments of the present invention.

FIG. 9 shows an example of notification details in one or more embodiments of the present invention. The screen shown in FIG. 9 is a screen Di104, which shows what is sent to a player having a first list that includes player A, when player A has participated in a drawing event (made a drawing). Notification details Ni102 are displayed on the screen Di104. The notification details Ni102 are displayed as a pop-up within the screen, for example.

The notification details Ni102 include the names of participating players, the names of drawing events in which they participated, the number of people until the quota is reached, how much of the predetermined time period is left, and so forth. During a drawing event, the notification shown in FIG. 9 is given every time a player included in the friend list makes a drawing, so players can be motivated to make a drawing.

FIG. 10 shows an example of adding to the second list in one or more embodiments of the present invention. FIG. 10A is the first list (friend list) of player A, and FIG. 10B is the second list (participant list) of player A. FIG. 10C is the first list of player B, and FIG. 10D is the second list of player B. FIG. 10E is the first list of player C, and FIG. 10F is the second list of player C. In the examples shown in FIG. 10, the first and second lists are illustrated in simplified form, so the first list has only player names, and the second list has only player names and drawing times.

As shown in FIG. 10B, let us assume that player A has participated, by making a drawing at 9:00 p.m., in a drawing event in which players B, C, and D included in player A's own first list (FIG. 10A) have participated. At this point, notification indicating that player A has participated in a drawing event is sent to players B and C having a first list that includes player A.

FIG. 10D shows a second list generated for player B as a result of the participation of player A in a drawing event. In the example shown in FIG. 10D, of the players in player B's first list (FIG. 10C), only player A is included in the second list of player B because player A participated in a drawing event for the first time.

FIG. 10F shows a second list generated for player C as a result of the participation of player A in a drawing event. In the example shown in FIG. 10F, of the players in player C's first list (FIG. 10E), player A is added to the second list including player B because player A participated in a drawing event right after player B.

The second generator 516 and the determination component 518 may receive notification indicating that a player has participated in a drawing event, in which case a player can be added to the second list, or the count value can be increased.

Figure 11:
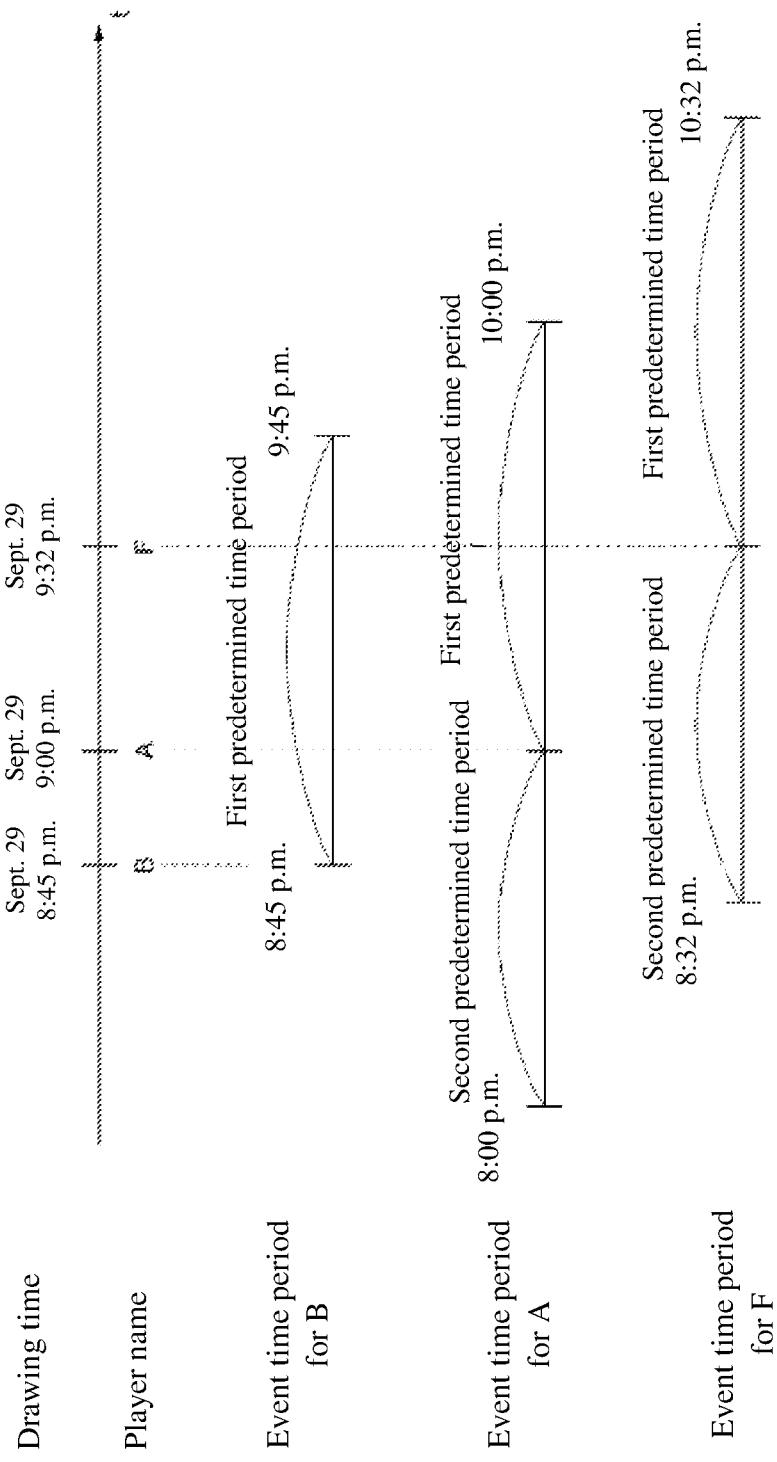
FIG. 11 is a diagram illustrating an example of measuring a predetermined time period indicating the time limit of a drawing event according to one or more embodiments of the present invention.

FIG. 11 is a diagram illustrating an example of measuring a predetermined time period indicating the time limit of a drawing event in one or more embodiments of the present invention. In the example shown in FIG. 11, the first predetermined time period indicating the basic time limit of the drawing event is given as one hour. Also, the second predetermined time period is given as one hour, but this need not be the same as the first predetermined time period.

As shown in FIG. 11, in the campaign period launched by the drawing controller 512, let us assume that player B makes a drawing at 8:45 p.m. on September 29, player makes a drawing at 9:00 p.m. on September 29, and player F makes a drawing at 9:32 p.m. on September 29.

At this point, players A, B, and F are friends, and none of the other friends of the players has participated in the drawing event.

Premised on the above, the timing of the drawing event for player B is a start time of 8:45 p.m., and an end time (after the first predetermined time period has elapsed) is 9:45 p.m.

When player A, having received notification of the drawing event participation of player B, participates in the drawing event at 9:00 p.m., the timing of the drawing event for player A is a start time of 8:00 p.m., which is prior to the second predetermined time period prior to the drawing time of 9:00 p.m., and an end time of 10:00 p.m., which is after the first predetermined time period after 9:00 p.m.

Similarly, when player F, having received notification of the drawing events of players B and A, participates in the drawing event at 9:32 p.m., the timing of the drawing event for player F is a start time of 8:32 p.m., which is prior to the second predetermined time period prior to the drawing time of 9:32 p.m., and an end time of 10:32 p.m., which is after the first predetermined time period after 9:32 p.m.

Specifically, the drawing controller 512 may measure the timing of a drawing event backward from the time at which the player himself made a drawing, as with players A and F. This extends the duration of the drawing event and makes it easier to reach the quota.

Also, the award component 522 may give player B, who is the first to draw in the first list, a reward of higher value than that for players A and F as the reward for reaching the quota. This means that players can be motivated to be the first one to draw.

Figure 12:
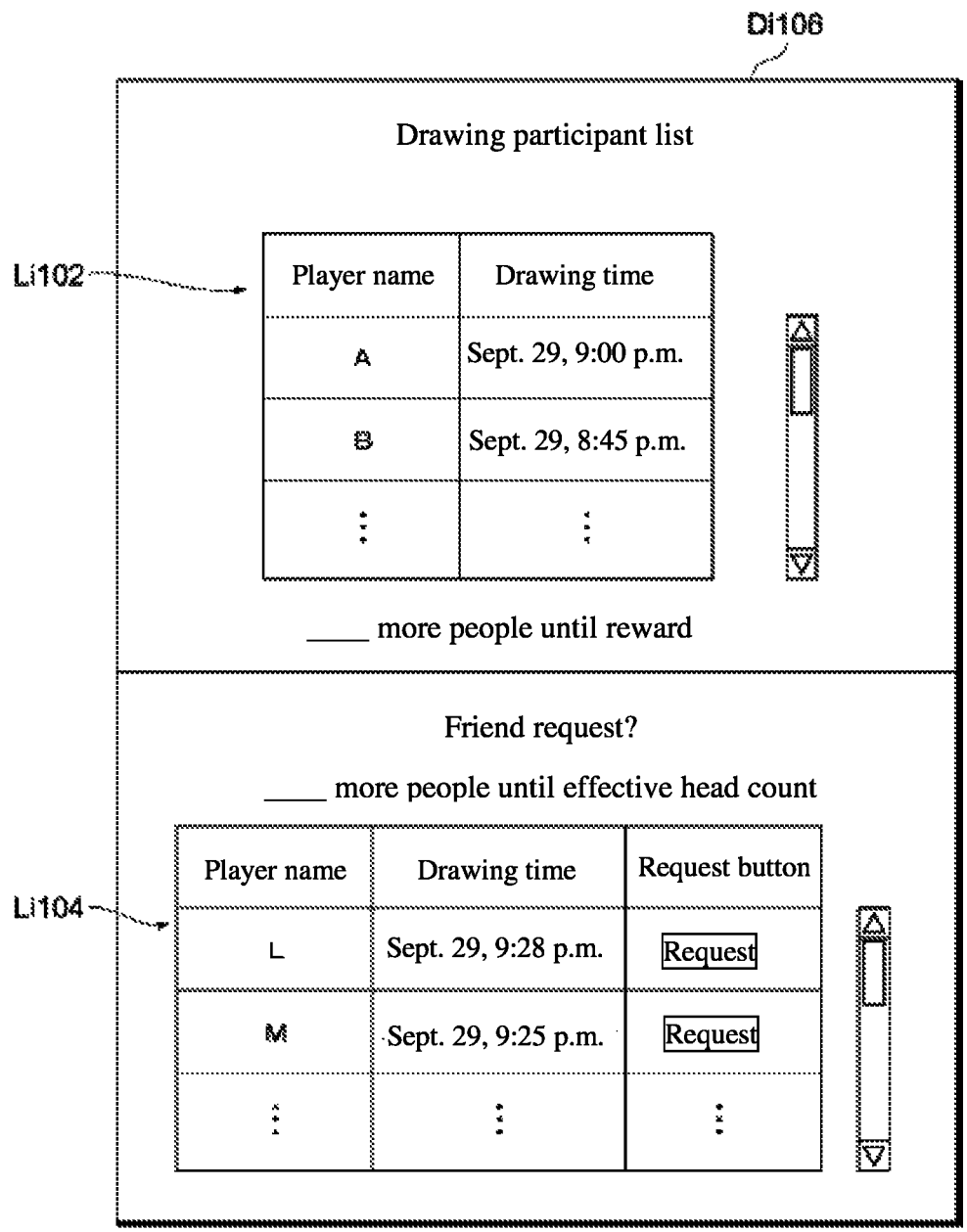
FIG. 12 shows an example of a screen on which a second list and a recommendation list are displayed according to one or more embodiments of the present invention.

FIG. 12 shows an example of a screen on which a second list and a recommendation list are displayed in one or more embodiments of the present invention. The screen shown in FIG. 12 is the screen Di106 of a game device 10, and the second list Li102 shown in FIG. 7 and the number of people until the quota is reached are displayed. Also displayed on the screen Di106 is the recommendation list Li104 generated by the recommendation component 528. The recommendation list includes player names, drawing times, and a request button. Also displayed on the screen Di106 is the effective number of people that will be counted in the drawing event. The players can make friend requests to players numbering above the effective number of people, and can perform friend registrations, but there is an upper limit to the number of people counted as participants in a drawing event.

Consequently, when a player makes a friend request to a player displayed on the recommendation list Li104, that player can be added to the friend list, allowing players who have already made a drawing to be made friends, and reducing the remaining number of people until the quota is reached. Furthermore, by providing an upper limit to the effective number of people serving as the count value for players registered as friends from the recommendation list, players are prevented from reaching the quota merely by making a large number of friend requests only to players included in the recommendation list.

Operation

Figure 13:
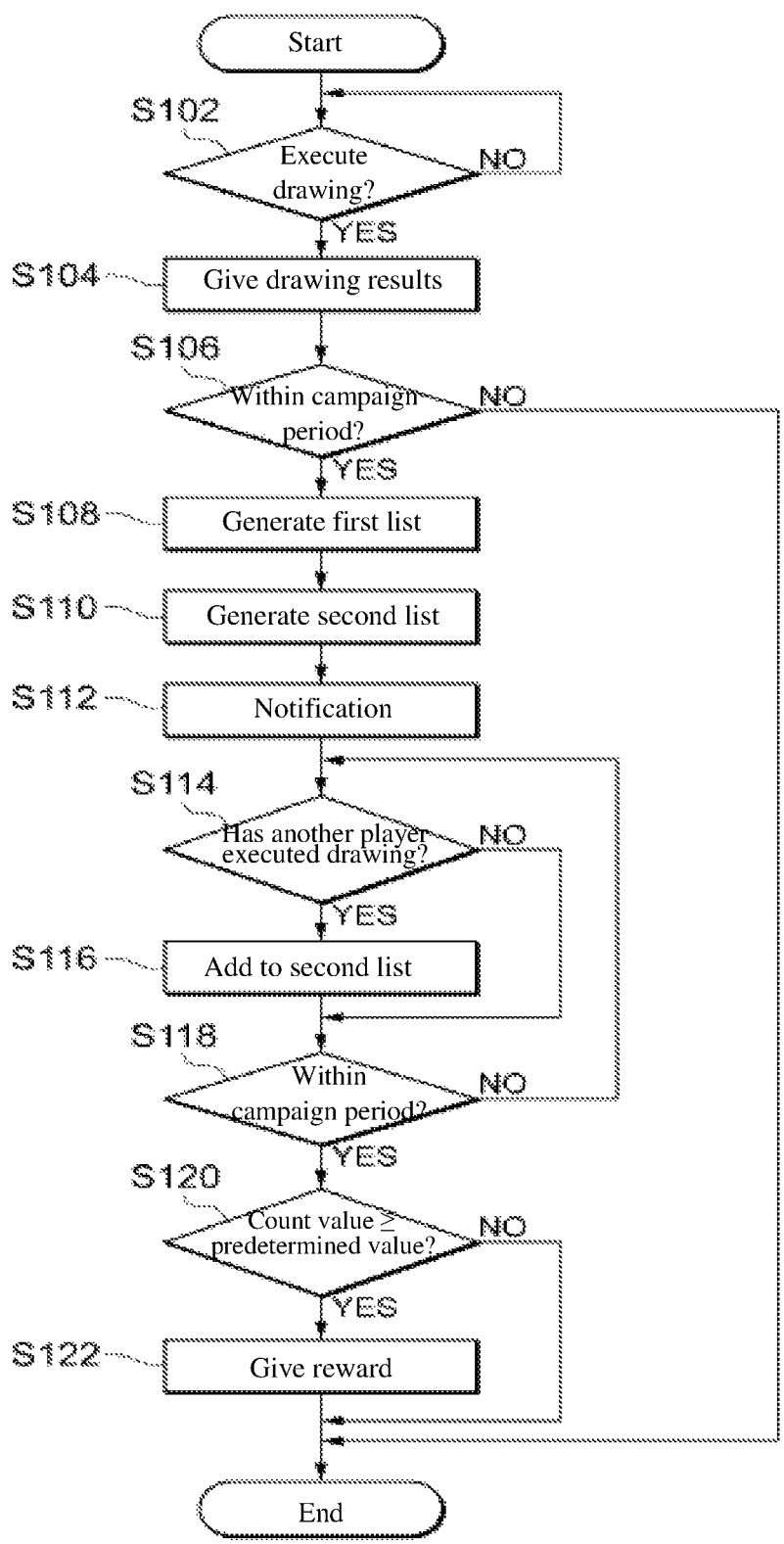
FIG. 13 is a flowchart of an example of drawing processing A in a game processing system according to one or more embodiments of the present invention.

Next, the operation related to the drawing processing of the game processing system 1 in one or more embodiments of the present invention will be described. The following description is divided into drawing processing A when player A is the first to draw, and drawing processing B when player B receives a notification and makes a drawing. FIG. 13 is a flowchart of an example of drawing processing A in the game processing system 1 in one or more embodiments of the present invention.

In step S102 shown in FIG. 13, the drawing controller 512 determines whether or not player A has executed a drawing. If a drawing has been executed (Yes in step S102), the flow proceeds to step S104, but if no drawing has been executed (No in step S102), the flow returns to step S102.

In step S104, the award component 522 gives the players the drawing results.

In step S106, the drawing controller 512 determines whether or not the drawing time is within the campaign period of the drawing event. If it is within the campaign period (Yes in step S106), the flow proceeds to step S108, but if it is outside the campaign period (No in step S106), the processing is ended.

In step S108, the first generator 514 generates a first list for each player that includes players who satisfy a predetermined condition. Satisfying a predetermined condition means that they are registered as friends, they fall within a predetermined range using location information, etc.

In step S110, the second generator 516 generates a second list that includes players who have made a drawing.

In step S112, the notification component 520 performs processing to notify players having a first list that includes player A who made a drawing.

In step S114, the determination component 518 determines whether or not another player included in the first list has executed a drawing. The determination component 518 can determine whether or not another player has executed a drawing from whether or not a notification has been received. If another player has executed a drawing (Yes in step S114), the flow proceeds to step S116, and if another player has not executed a drawing (No in step S114), the flow proceeds to step S118.

In step S116, the second generator 516 adds the other players who have executed a drawing to the second list.

In step S118, the determination component 518 determines whether or not a predetermined time period (the time limit of the drawing event) has elapsed. If the predetermined time period has elapsed (Yes in step S118), the flow proceeds to step S120, and if the predetermined time period has not elapsed (No in step S118), the flow returns to step S114.

In step S120, the determination component 518 determines whether or not the count value obtained by counting player A and players who have made a drawing in the first list is greater than or equal to a predetermined value. If the count value is greater than or equal to the predetermined value (Yes in step S120), the flow proceeds to step S122, and if the count value is less than the predetermined value (No in step S120), the processing is ended.

In step S122, the award component 522 gives a reward to players who have made a drawing. At this point the award component 522 may give a reward of higher value to the first player to draw (player A).

Figure 14:
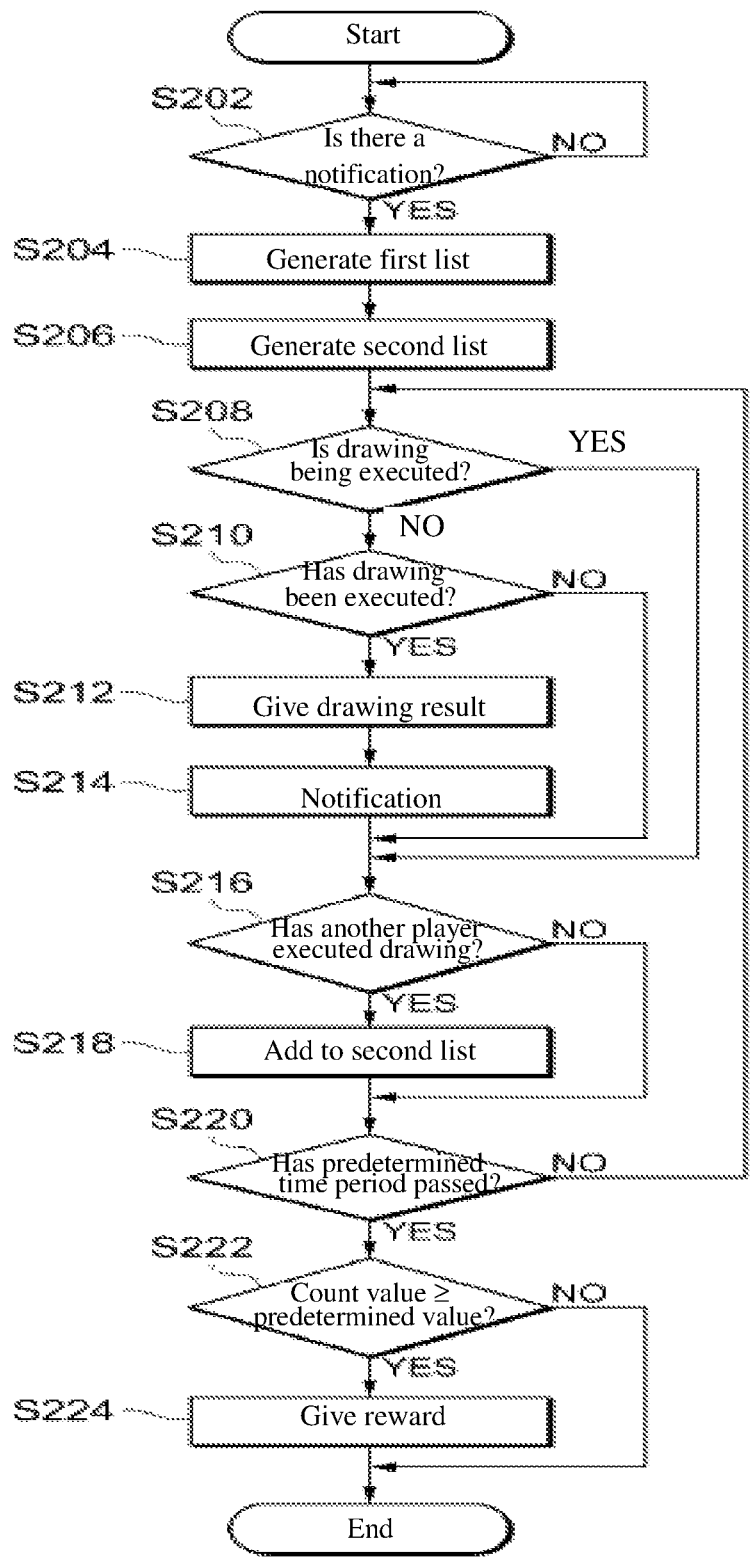
FIG. 14 is a flowchart of an example of drawing processing B in a game processing system according to one or more embodiments of the present invention.

FIG. 14 is a flowchart of an example of drawing processing B in the game processing system 1 in one or more embodiments of the present invention.

In step S202 shown in FIG. 14, the game controller 506 determines whether or not there is a notification that another player has executed a drawing. If there is such a notification (Yes in step S202), the flow proceeds to step S204, and if there is no notification (No in step S202), the flow returns to step S206.

In step S204, the first generator 514 generates a first list for each player that includes players who satisfy a predetermined condition. Satisfying a predetermined condition means that they are registered as friends, they fall within a predetermined range using location information, etc.

In step S206, the second generator 516 generates a second list that includes players who have made a drawing (notified players).

In step S208, the drawing controller 512 determines whether or not player B is executing drawing processing. If a drawing is already being executed (Yes in step S208), the flow proceeds to step S216, and if no drawing is being executed (No in step S208), the flow proceeds to step S210.

In step S210, the drawing controller 512 determines whether or not a drawing has been executed by player B. If a drawing has been executed (Yes in step S210), the flow proceeds to step S212, and if no drawing has been executed (No in step S210), the flow proceeds to step S216.

In step S212, the award component 522 gives the players the drawing results.

In step S214, the notification component 520 performs processing to notify players having a first list that includes player B who made a drawing.

Steps S216 to S224 are the same as the processing in steps S114 to S122 shown in FIG. 13, and therefore will not be described again.

The various processing steps included in the processing flow discussed above can be executed in parallel or with the order changed as desired, so long as this causes no contradictions in the processing details, and other steps may also be added in between these processing steps. Also, steps that are discussed as a single step for the sake of convenience may be divided up and executed as a plurality of steps, while those discussed as being divided into a plurality of steps for the sake of convenience may be considered as a single step.

The drawing processing shown in FIGS. 13 and 14 is nothing but an example, and for the sake of convenience in description, processing was described as being divided up by player, but in actual practice the processing is not divided up by player.

According to one or more embodiments of the present invention, a system is provided that enhances the enjoyability of the game while suitably fostering cooperation among a plurality of players in the drawing processing of the game.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims. Furthermore, the functions on the server 50 side may be provided as needed on the game device 10 side.

If a first list is associated with a particular player, when a quota is reached by the particular player and the players in the first list, the award component 522 may give a reward to the particular player. This makes it possible for parents to make a drawing for their children and to give a reward only to the children when the first list consists of a group with a strong relationship, such as a family. Also, the first generator 514 may use a friend list itself as the first list, or may use part of a friend list as the first list.

1 Game Processing System
10 Game Device
50 Server
60 Billing Server
102 Controller
106 Communication Interface
108 Memory
114 Display Component
116 Input Component
502 Second Transmitter
504 Second Receiver
506 Game Controller
512 Drawing Controller
514 First Generator
516 Second Generator
518 Determination Component
520 Notification Component
522 Award Component
524 Billing Controller
526 Display Controller
528 Recommendation Component

What is claimed is:

1. An information processing device, comprising:
a controller that generates a first list that includes a plurality of players while a game is underway;
a memory that stores the first list;
a receiver that receives a request from an external device to acquire an intangible item to be executed in the game based on input from one of the players; and
a transmitter that transmits a signal to the external device, wherein
the controller counts a number of predetermined players who have input the request within a first time period among the plurality of players,
the controller outputs, to the transmitter, an instruction to award the intangible item to the predetermined players when the number is less than a predetermined value, and
the controller outputs, to the transmitter, an instruction to award the intangible item and an additional intangible item to the predetermined players when the number is greater than or equal to the predetermined value.

2. The information processing device according to claim 1, wherein
the controller generates a second list that includes the predetermined players, and
the controller that causes the second list to be displayed on a play screen of the game.

3. The information processing device according to claim 2, wherein the controller generates the first list based on location information that indicates locations related to players or a friend list that includes players registered as friends.

4. The information processing device according to claim 2, wherein
the controller generates the first list for each of the plurality of players,
when the receiver receives the request based on input from a first player, the controller counts a number of first predetermined players who have input the request within either the first time period or a second time period,
the first predetermined players are included in the first list corresponding to the first player,
the first time period is anytime after the first player makes the request, and
the second time period is anytime before the first player makes the request.

5. The information processing device according to claim 2, wherein
the controller generates a third list that includes third predetermined players who have input the request within the first time period,
the third predetermined players are different from the plurality of players in the first list, and
the controller causes recommendation information that recommends including the third predetermined players into the first list to be displayed on a play screen of the game.

6. The information processing device according to claim 1, wherein the controller generates the first list based on location information that indicates locations related to players or a friend list that includes players registered as friends.

7. The information processing device according to claim 6, wherein
the controller generates the first list for each of the plurality of players,
when the receiver receives the request based on input from a first player, the controller counts a number of first predetermined players who have input the request within either the first time period or a second time period, the first predetermined players are included in the first list corresponding to the first player, the first time period is anytime after the first player makes the request, and the second time period is anytime before the first player makes the request.

8. The information processing device according to claim 6, wherein the controller generates a third list that includes third predetermined players who have input the request within the first time period, the third predetermined players are different from the plurality of players in the first list, and the controller causes recommendation information that recommends including the third predetermined players into the first list to be displayed on a play screen of the game.

9. The information processing device according to claim 1, wherein the controller generates the first list for each of the plurality of players, when the receiver receives the request based on input from a first player, the controller counts a number of first predetermined players who have input the request within either the first time period or a second time period, the first predetermined players are included in the first list corresponding to the first player, the first time period is from when the first player makes the request to a predetermined ending point, and the second time period is from a predetermined starting point before the first player makes the request.

10. The information processing device according to claim 9, wherein when the receiver receives the request based on input from a second player, the controller causes information that indicates the received request and how much time remains in the first time period to be displayed on a play screen of the game for a second predetermined player, and the second predetermined player has a first list that includes the second player.

11. The information processing device according to claim 10, wherein the controller generates a third list that includes third predetermined players who have input the request within the first time period, the third predetermined players are different from the plurality of players in the first list, and the controller causes recommendation information that recommends including the third predetermined players into the first list to be displayed on a play screen of the game.

12. The information processing device according to claim 9, wherein the controller generates a third list that includes third predetermined players who have input the request within the first time period, the third predetermined players are different from the plurality of players in the first list, and the controller causes recommendation information that recommends including the third predetermined players into the first list to be displayed on a play screen of the game.

13. The information processing device according to claim 1, wherein the controller generates a third list that includes third predetermined players who have input the request within the first time period, the third predetermined players are different from the plurality of players in the first list, and the controller causes recommendation information that recommends including the third predetermined players into the first list to be displayed on a play screen of the game.

14. The information processing device according to claim 13, wherein the controller sorts the third predetermined players based on request time when the third predetermined players input the request.

15. The information processing device according to claim 1, wherein a receiver that receives information of a clock time designated by a player, wherein the controller determines a start time of the first time period based on the received information of the clock time.

16. The information processing device according to claim 1, wherein after the controller has determined to award the intangible item to the predetermined players, the controller counts a number of players who have input the request among the plurality of players, when the number is greater than or equal to the predetermined value, the controller determines to award the additional intangible item to the players.

17. The information processing device according to claim 1, wherein the receiver receives the request based on billing instruction from the player.

18. The information processing device according to claim 1, wherein the request is information that indicates request of drawing of the intangible item or request of purchase of the intangible item.

19. A method that causes a computer to execute a game program, the method comprising:

generating, with a controller of the computer, a first list that includes a plurality of players while a game is underway;

storing, with a memory of the controller, the first list;

receiving, with a receiver of the computer, a request from an external device to acquire an intangible item to be executed in the game based on input from one of the players;

counting, with the controller, a number of predetermined players who have input the request within a predetermined time period among the plurality of players;

outputting, from the controller to a transmitter of the computer, an instruction to award the intangible item to the predetermined players when the number is less than a predetermined value, and an instruction to award the intangible item and an additional intangible item to the predetermined players when the number is greater than or equal to the predetermined value; and transmitting, from the transmitter to the external device, the instruction.

20. A game processing system comprising:

a game device that comprises:

a first transmitter that transmits, to an information processing device, request information that indicates a request to acquire an intangible item to be executed in the game based on input from a player; and a first receiver that receives a result of the request, and an information processing device that comprises:

a controller that generates a first list including a plurality of players while a game is underway;

a memory that stores the first list;

a second receiver that receives, from the first transmitter, the request information; and a second transmitter that transmits a signal to the game device, wherein the controller counts, based on the request information, a number of predetermined players who have input the requests within a predetermined time period among the plurality of players, the controller outputs, to the second transmitter, an instruction to award the intangible item to the predetermined players when the number is less than a predetermined value, and the controller outputs, to the second transmitter, an instruction to award the intangible item and an additional intangible item to the predetermined players when the number is greater than or equal to the predetermined value.

* * * * *